(12) United States Patent
Allsup et al.

(10) Patent No.: US 6,271,987 B1
(45) Date of Patent: *Aug. 7, 2001

(54) CIRCUMFERENTIALLY EXTENDING DISC SNUBBER

(75) Inventors: David Scott Allsup, Oklahoma City; Carl Fred Adams, Yukon; John Daniel Stricklin, Oklahoma City, all of OK (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,437

(22) Filed: Nov. 21, 1997

Related U.S. Application Data
(60) Provisional application No. 60/057,804, filed on Aug. 28, 1997.

(51) Int. Cl.[7] .............................. G11B 33/14; G11B 17/00
(52) U.S. Cl. ....................................... 360/97.03; 360/97.02
(58) Field of Search .............................. 360/97.01, 97.02, 360/98.01

(56) References Cited

U.S. PATENT DOCUMENTS

| | | |
|---|---|---|
| 3,713,121 | 1/1973 | Fasano et al. . |
| 4,843,503 | 6/1989 | Hazebrouck et al. . |
| 5,231,556 | 7/1993 | Blanks . |
| 5,404,636 | 4/1995 | Stefanski et al. . |
| 5,422,770 | 6/1995 | Alt . |
| 5,757,587 | * 5/1998 | Berg et al. .......................... 360/105 |
| 5,831,793 | * 11/1998 | Resh ................................... 360/104 |

FOREIGN PATENT DOCUMENTS

| | | |
|---|---|---|
| 404079085A | 3/1992 | (JP) . |
| 404188476A | 6/1997 | (JP) . |

* cited by examiner

Primary Examiner—William Klimowicz
(74) Attorney, Agent, or Firm—Crowe & Dunlevy

(57) ABSTRACT

An apparatus is disclosed for reducing disc deflection in response to the application of a non-operational mechanical shock to a disc drive. The disc drive comprises discs rotatable about a disc axis and each having an outer diameter. A circumferentially extending snubber is provided proximate a substantial portion of the outer diameter of each of the discs. The snubber includes a shroud portion immediately proximate the outer diameter of each disc and snubber arms which extend from the shroud portion in a direction toward the disc axis. The snubber limits deflection of the outer diameter of each disc in response to the application of a nonoperational mechanical shock to the disc drive.

7 Claims, 3 Drawing Sheets

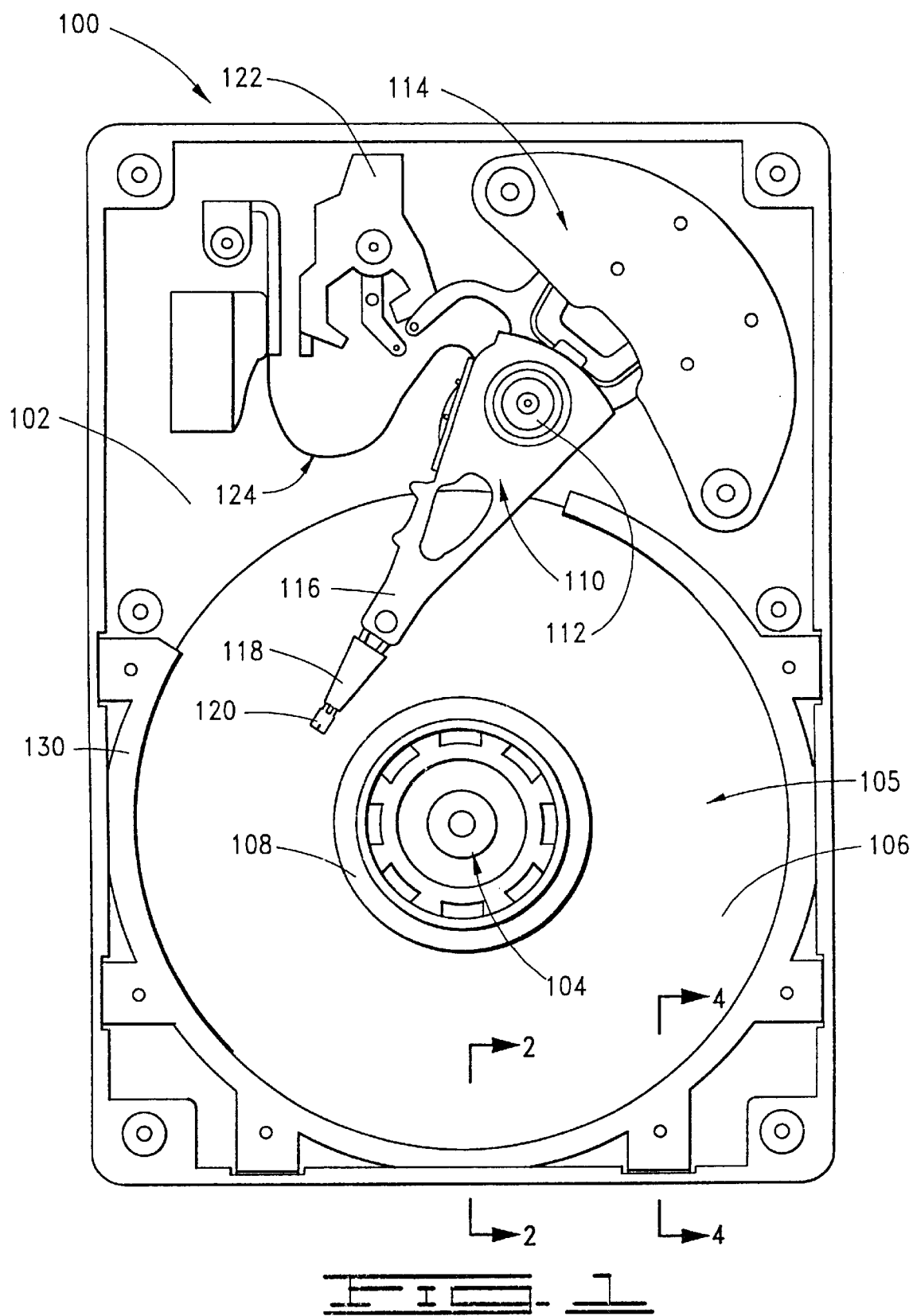

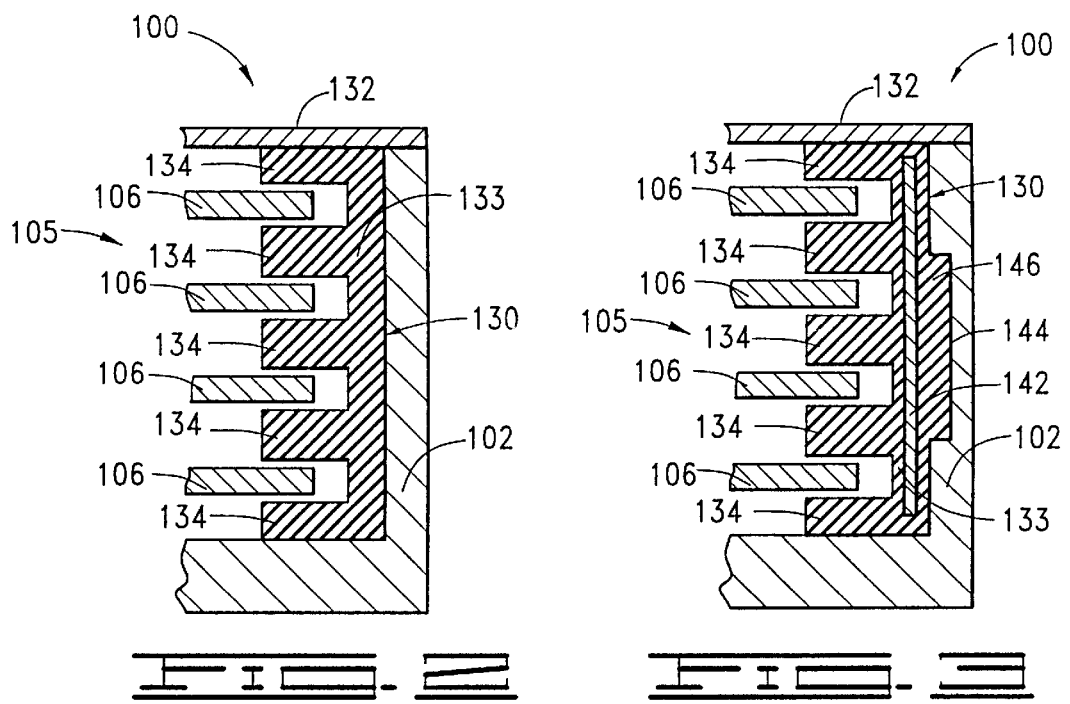
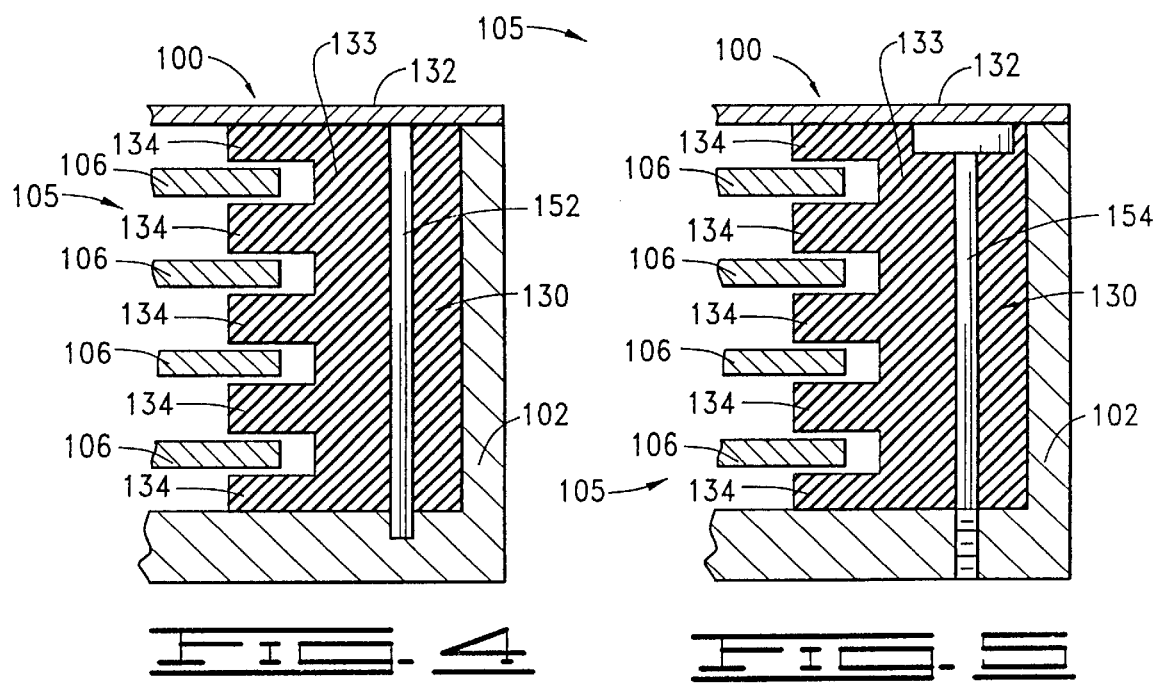

CIRCUMFERENTIALLY EXTENDING DISC SNUBBER

RELATED APPLICATIONS

This application claims the benefit of Provisional Application No. 60/057,804 entitled C-RING DISC SNUBBER FOR NON-OPERATING SHOCK PROTECTION OF A DISC DRIVE, filed Aug. 28, 1997.

FIELD OF THE INVENTION

This invention relates generally to the field of disc drive storage devices, and more particularly, but not by way of limitation, to minimizing damage to discs of a disc drive in response to the application of a non-operational mechanical shock to the drive.

BACKGROUND OF THE INVENTION

Hard disc drives enable users of computer systems to store and retrieve vast amounts of data in a fast and efficient manner. In a typical disc drive, the data are magnetically stored on one or more discs which are rotated at a constant high speed and accessed by a rotary actuator assembly having a plurality of read/write heads that fly adjacent the surfaces of the discs.

The heads are suspended from flexure assemblies extending from arms of the rotary actuator assembly and include aerodynamic features that enable the heads to fly upon an air bearing established by air currents set in motion by the rotation of the discs. When the disc drive is deactivated, a shutdown operation is commenced wherein the heads are moved to a safe parking position before the discs come to a stop.

It is a continuing trend in the disc drive industry to provide disc drives with ever increasing data storage capacities using the same or a smaller form factor (i.e., outside dimensions) for the drives. As a result, successive generations of drives are often provided with discs that are closer together, reducing disc to actuator arm clearances. At the same time, disc drives are being utilized in environmentally harsher environments, such as portable computers, requiring increases in the robustness characteristics of the drives so as to withstand ever greater external vibrational and shock input levels. For example, a typical disc drive might be required to withstand up to a 200 g mechanical shock in a nonoperating mode.

Such mechanical shocks can cause significant deflection of the discs, leading to catastrophic damage to the disc media and heads. More particularly, disc to arm contact can induce a shock wave large enough to travel down to the flexure assemblies and heads, causing the heads to lift off of the disc surfaces as a result of the relatively flexible flexure assemblies to which the heads are attached. The heads can thus obtain significant velocities as they accelerate away from and then back toward the discs. When such velocities are sufficiently severe, damage can occur to the heads and the surfaces of the discs as the heads strike the landing zone portions of the discs. Moreover, should a head tilt during such liftoff, a corner of the head can strike the disc surface, increasing the probability of damage to the head or the disc.

Disc snubbers such as disclosed in U.S. Pat. No. 5,422,770 issued Jun. 6, 1995 to Alt ("Alt '770") have been provided in the prior art in an attempt to limit the deflection of the discs of a disc drive subjected to large nonoperational shocks. However, it has been observed that localized snubbers such as disclosed by Alt '770 tend to suppress disc deflection at the snubber location, but the remaining portions of the disc still typically deflect as before. This is particularly egregious when discs are fabricated from brittle materials, such as glass. Although glass discs are stiffer and possess harder surfaces than discs fabricated from aluminum, so that glass discs tend to deflect less than aluminum discs, glass discs are more likely to shatter when subjected to high amplitude mechanical shocks.

Accordingly, there is a need for an improved approach to minimizing damage to a disc drive as a result of nonoperational shock by limiting the ability of the discs to contact the arms of an actuator of the disc drive.

SUMMARY OF THE INVENTION

The present invention provides an apparatus for limiting damage to a disc drive as a result of application of a nonoperational mechanical shock to the disc drive.

In accordance with a preferred embodiment, the disc drive comprises a plurality of discs having magnetic recording surfaces, a spindle motor for rotating the discs about a disc axis and a plurality of controllably positionable heads adjacent the recording surfaces. The discs are provided with landing zones where the heads come to rest when the disc drive is deactivated.

A circumferentially extending snubber is provided proximate a substantial portion of the outer diameter of the discs. The snubber includes a shroud portion proximate the outer diameter of the discs and snubber arms which extend from the shroud portion in a direction toward the disc axis. The snubber arms limit deflection of the outer diameter of the discs in response to the application of a non-operational mechanical shock to the disc drive. The snubber further acts as a disc shroud to substantially retain air currents established by the rotation of the discs.

In one preferred embodiment, the snubber is characterized as a one-piece c-ring shaped member; in another preferred embodiment, the snubber is characterized as a multi-piece member. Preferably, the snubber extends a maximum amount around the outer diameter of the discs so as to be proximate over 50% of the circumference of the discs.

These and various other features as well as advantages which characterize the present invention will be apparent from a reading of the following detailed description and a review of the associated drawings.

BRIEF DESCRIPTION OF THE DRAWINGS

FIG. 1 shows a top plan view of a disc drive including a circumferentially extending disc snubber constructed in accordance with a preferred embodiment of the present invention.

FIG. 2 provides an elevational, cross-sectional view of a portion of the disc drive of FIG. 1, as viewed along line 2—2 of FIG. 1, showing a first preferred construction for the circumferentially extending disc snubber.

FIG. 3 provides an elevational, cross-sectional view of an alternative construction for the circumferentially extending disc snubber of FIG. 2.

FIG. 4 provides an elevational, partial cross-sectional view of a portion of the disc drive of FIG. 1, as viewed along line 4—4 of FIG. 1, showing the use of a dowel pin to secure the circumferentially extending disc snubber relative to the base deck of the disc drive.

FIG. 5 provides an elevational, partial cross-sectional view of an alternative construction for the circumferentially extending disc snubber of FIG. 4, wherein a threaded bolt is used to secure the snubber to the base deck of the disc drive.

DETAILED DESCRIPTION

Figure 6:
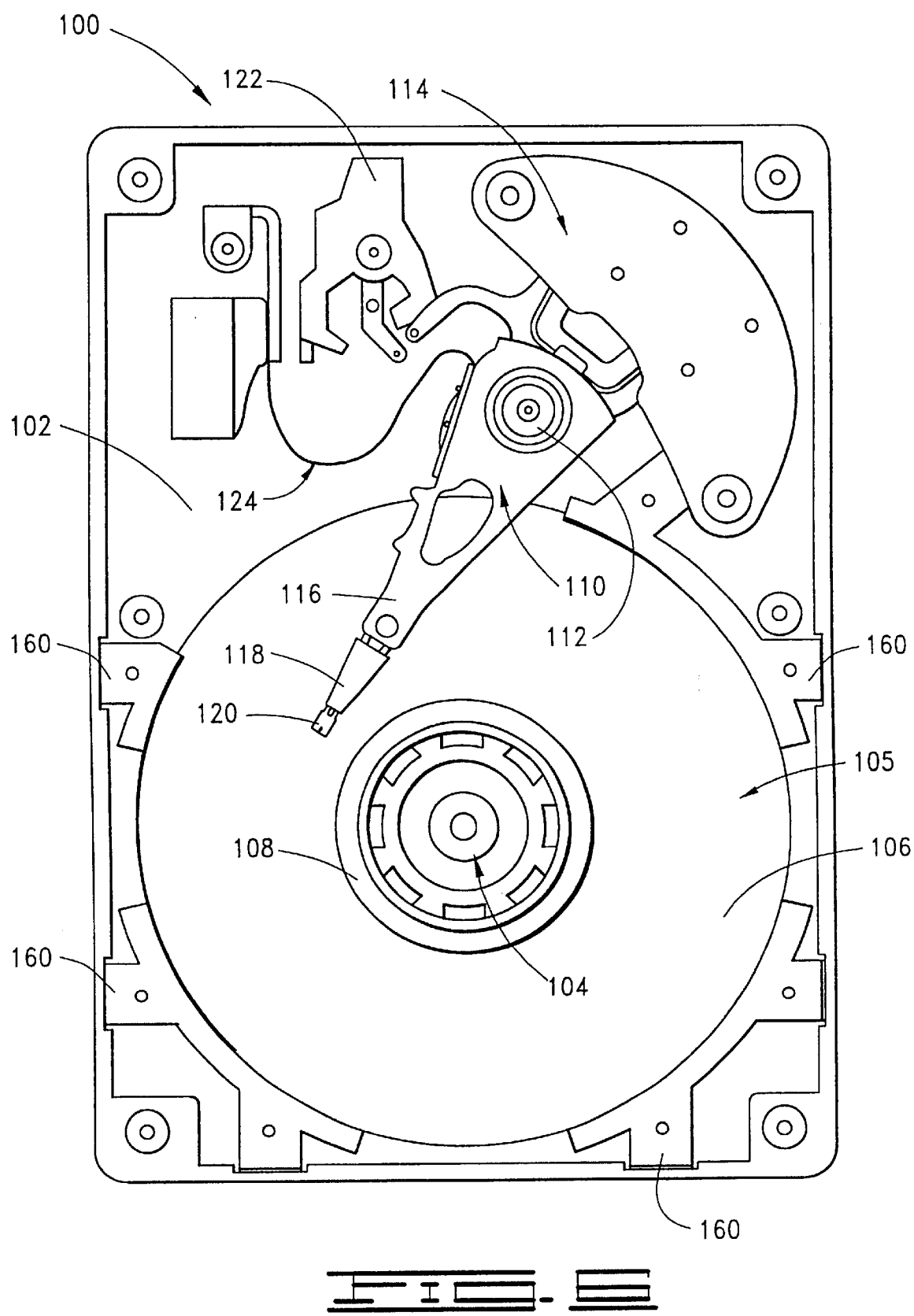
FIG. 6 provides a top plan view of a disc drive similar to the disc drive of FIG. 1, illustrating yet another preferred embodiment for the circumferentially extending disc snubber.

Referring now to the drawings, and more particularly to FIG. 1, shown therein is a disc drive 100 constructed in accordance with a preferred embodiment of the present invention. The disc drive 100 includes a base deck 102 on which various components of the disc drive 100 are mounted. A top cover (not shown) cooperates with the base deck 102 to form an internal, sealed environment for the disc drive in a conventional manner.

A spindle motor (shown generally at 104) is provided to rotate a stack 105 of four discs 106 at a constant high speed (only the top disc is shown in FIG. 1). A disc clamp 108 secures the discs 106 to a hub (not separately designated) of the spindle motor 104.

To transfer data to and from the discs 106, a controllably positionable actuator assembly 110 is provided which rotates about a cartridge bearing assembly 112 in response to currents applied to a coil (not separately designated) of a voice coil motor (VCM) 114. The actuator assembly 110 includes a plurality of arms (the topmost of which is identified at 116) from each of which corresponding flexure assemblies 118 extend. Heads 120 are provided at distal ends of the flexure assemblies 118 and are supported over the discs 106 by air bearings established by air currents set up by the rotation of the discs 106. For reference, a latch assembly 122 is provided to secure the heads 120 over landing zones at the innermost diameters of the discs 106 when the disc drive 100 is deactivated and a flex circuit assembly 124 provides electrical communication paths between the actuator assembly 110 and a disc drive printed circuit board (not shown) mounted to the underside of the disc drive 100 in a conventional manner.

Continuing with FIG. 1, a circumferentially extending disc snubber (hereinafter also referred to as the "snubber") is provided and designated at 130. The snubber 130 comprises a C-ring shaped member proximate to a substantial portion of the circumferences of the discs 106. As discussed below, the snubber 130 serves to protect the disc drive 100 from damage due to the application of mechanical shocks by limiting the deflection of the discs 106 over substantially all of the circumferences of the discs 106 and maintaining the clearance between the arms 116 and the discs 106, thereby reducing the amount of potential energy stored in the discs 106 as a result of such a mechanical shock event and substantially improving the robustness characteristics of the disc drive 100. Moreover, during operation of the disc drive 100 the snubber 130 effectively shrouds the disc stack 105, improving the efficiency of operation of the disc drive 100 by improving the uniformity of the air currents established by the rotation of the discs 106 and reducing drag on the spindle motor 104.

Referring now to FIG. 2, shown therein is an elevational, cross-sectional view of the snubber 130 in conjunction with portions of the disc drive 100, as viewed along line 2—2 of FIG. 1. For reference, a top cover 132 of the disc drive is provided, said cover having been omitted from FIG. 1 for purposes of clarity.

As shown in FIG. 2, the snubber 130 includes a plurality of snubber arms 134 disposed between adjacent discs 106 and from a shroud portion 133 toward the spindle motor 104 (FIG. 1). When a mechanical shock is applied to the disc drive 100 sufficient to cause deflection of the discs 106 in a direction parallel to the rotational axis of the discs 106, the discs will contact the snubber arms 134, thereby limiting the amount of travel of the edges of the discs 106. The snubber 130 is preferably fabricated from a suitable nonmarring, nonparticulating material, such as Delrin®, a registered trademark of E. I. Du Pont De Nemours and Company, or Carilon®, a registered trademark of Shell Oil Company.

It will be recognized that the distance between adjacent snubber arms 134 and discs 106 will determine the extent to which the snubber 130 protects against damage to the disc drive 100. Moreover, improved snubbing characteristics are generally obtained as the distance that the snubber arms 134 extend into the stack of discs 106 is increased; however, those portions of the discs 106 immediately proximate the snubber arms 134 are unaccessible by the heads 120, so that less media recording surface area is available as the snubber arms 134 are extended farther into the stack of discs 106. Accordingly, optimum dimensions for the snubber arms 134 will be determined based on the requirements of each particular application.

FIG. 3 provides an elevational, cross-sectional view of an alternative construction for the disc snubber 130 of FIGS. 1 and 2. More particularly, as shown in FIG. 3 the snubber 130 further includes a C-shaped metal ring 142 over which the snubbing material is molded. Only a cross-section of the ring 142 is shown in FIG. 3, but it will be readily understood that the ring 142 extends substantially the full length of the snubber 130, as illustrated in FIG. 1. The ring 142 provides additional stiffness for holding the snubber 130 in place. Moreover, recesses 144 can be provided at selected locations in the base deck 102 in order to accommodate location tabs 146 which improve the stability and vertical placement of the snubber 130 relative to the base deck 102 and disc stack 105.

Installation of the snubber 130 is relatively straightforward. Once the disc stack 105 has been assembled (and before the discs 106 have been attached relative to the base deck 102), the snubber 130 is expanded and placed around the perimeter of the discs 106. The snubber 130 is then contracted by pulling oppositely disposed ends toward one another until the snubber 130 contacts the discs. The spring characteristics of the snubber 130 will then tend to retain the snubber 130 relative to the discs 106; however, an optional retaining piece (not shown) can be used to secure the ends of the snubber 130 so as to maintain the snubber 130 relative to the discs 106.

The discs 106 are then assembled relative to the base deck 102 and the snubber 130 is expanded into place. Fasteners can then be applied to secure the snubber 130 relative to the base deck 102, such as a press-fit dowel pin 152 shown in FIG. 4 or a threaded bolt 154 shown in FIG. 5. For reference, FIG. 4 is a view taken along line 4—4 in FIG. 1.

Finally, in cases where insufficient room is available to accommodate a single-piece snubber such as 130 of FIGS. 1–5, FIG. 6 provides an alternative circumferentially extending, multi-piece snubber (denoted generally at 160) within the disc drive 100. Although not extending about the discs 106 at locations where the discs 106 are immediately adjacent sidewalls of the base deck 102, the multi-piece snubber 160 nevertheless extends about a substantial portion of the discs 106 sufficient to provide substantial disc snubbing and to prevent damage to the discs 106 and heads 120. The multi-piece snubber 160 will also serve to shroud the discs 106, enhancing the operational efficiency of the disc drive 100. It is contemplated that the various alternative constructions for the one-piece snubber 130 can also be applied to the multi-piece snubber 160, as desired.

It is contemplated that the snubbers 130, 160 presented herein could be readily incorporated as the only snubber in a drive, or could be used in conjunction with additional snubbing configurations incorporated, for example, into the actuator arms 116. Moreover, it is contemplated that, to maximize effectiveness, the snubbers 130, 160 will be proximate at least 50% of the circumferences of the discs 106 (as shown in the drawings), greatly improving the snubbing characteristics of the disc drive 100.

Accordingly, the present invention provides several useful advantages over the prior art. First, the snubbers 130, 160 operate to minimize disc-arm contact in response to the application of mechanical shocks to the disc drive 100. As discussed above, arm-disc contact can result in damage to the outer diameters of the surfaces of the discs 106, as well as damage to the heads 120 as a result of vibrations of the actuator arms 116 which are transmitted to the flexure assemblies 118, causing the heads 120 to lift off and then slap against the discs 106.

Next, the snubbers 130, 160 advantageously limit the amount of deflection of the discs 106. That is, a substantial amount of the deflection of the discs is minimized over a substantial portion of the perimeters of the discs 106, minimizing the storage of potential energy available for additional modal vibrations. The increased contact area will also tend to distribute the load, which will reduce stress concentrations on the discs 106 during contact with the snubber arms 134. This is particularly useful when the discs 106 are fabricated from brittle materials such as glass, as the present invention will tend to keep such discs from shattering due to the application of a high amplitude mechanical shock.

An additional advantage is that the snubbers 130, 160 provide disc shrouding, eliminating the need to fabricate a separate shroud into the base deck 102. Accordingly, in designs requiring shrouds, base casting has usually been required in order to fabricate the shrouds; use of the snubbers 130, 160, however, eliminate this requirement and allows the base deck to be fabricated from simpler, less costly methods, such as extrusion.

In view of the foregoing discussion, it will be clearly understood that the present invention is directed to an apparatus for reducing disc deflection in response to the application of a nonoperational mechanical shock to a disc drive (such as 100). The disc drive comprises a disc (such as 106) rotatable about a disc axis and having an outer diameter. A circumferentially extending snubber (such as 130, 160) is provided proximate a substantial portion of the outer diameter of the disc, the snubber including snubber arms (such as 134) immediately proximate the outer diameter of the disc and extending in a direction toward the disc axis. The snubber limits deflection of the outer diameter of the disc in response to the application of a nonoperational mechanical shock to the disc drive.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A snubber for limiting deflection of a disc stack of a disc drive in response to the application of a mechanical shock to the disc drive, the disc stack comprising at least first and second discs axially aligned for rotation about a common disc axis and having outermost perimeters extending a common radial distance from the disc axis, the snubber comprising:

a circumferentially extending shroud portion having a radius substantially that of the outermost perimeters and a length comprising a substantial portion of a circumference of the outermost perimeters, the shroud portion having facing surfaces which circumferentially extend substantially the length of the snubber beyond the outermost perimeters of the discs and which intersect planes normal to the disc axis along which the first and second discs extend to shroud the disc stack by retaining air currents established by the rotation of the outermost perimeters of the first and second discs;

first, second and third snubber arms extending from the shroud portion toward the disc axis along substantially the length of the snubber, wherein the outer perimeter of the first disc is disposed between the first and second snubber arms and the outer perimeter of the second disc is disposed between the second and third arms, and wherein the snubber is configured to expand to allow placement of the snubber about the outermost perimeters prior to installation of the disc stack in the disc drive; and a stiffening ring, disposed within the shroud portion, which circumferentially extends substantially the length of the shroud portion.

2. The snubber of claim 1, wherein the length of the shroud portion exceeds 50 percent of the circumference of the outermost perimeters.

3. The snubber of claim 1, wherein the disc drive further comprises a top cover and a base deck which cooperate to form an internal enclosure for the disc drive, the enclosure having an internal deck surface and at least first and second adjacent, internal side walls which extend substantially normally from the internal deck surface, and wherein the snubber continuously extends from a position proximate the first internal side wall to a position proximate the second internal side wall.

4. A disc drive, comprising:

a base deck;

a disc stack, mounted to the base deck, comprising at least first and second discs axially aligned for rotation about a common disc axis and having outermost perimeters extending a common radial distance from the disc axis; and a unitary piece circumferentially extending snubber having a length which continuously extends proximate at least 50 percent of the outermost perimeters to limit deflection of the disc stack in response to the application of a nonoperational mechanical shock to the disc drive, the snubber comprising:

a shroud portion having facing surfaces which circumferentially extend substantially the length of the snubber beyond the outermost perimeters of the discs and intersect planes normal to the disc axis along which the first and second discs extend, the shroud portion retaining air currents established by the rotation of the outermost perimeters of the first and second discs;

first, second and third snubber arms extending from the shroud portion toward the disc axis along substantially the length of the snubber, wherein the outer perimeter of the first disc is disposed between the first and second snubber arms and the outer perimeter of the second disc is disposed between the second and third arms, and wherein the snubber is configured to expand to allow placement of the snubber about the outermost perimeters prior to the mounting of the disc stack to the base deck; and a stiffening ring, disposed within the shroud portion, which circumferentially extends substantially the length of the snubber.

5. The disc drive of claim 4, further comprising at least one fastener which secures the snubber to the base deck.

6. A disc drive, comprising:

a top cover and a base deck which cooperate to form an internal enclosure for the disc drive, the enclosure having an internal deck surface and at least first and second adjacent, internal side walls which extend substantially normally from the internal deck surface;

a disc stack, mounted to the internal deck surface, comprising at least first and second discs axially aligned for rotation about a common disc axis and having outermost perimeters extending a common radial distance from the disc axis; and a unitary piece circumferentially extending snubber having a length which continuously extends from a position proximate the first internal side wall to a position proximate the second internal side wall to limit deflection of the disc stack in response to the application of a nonoperational mechanical shock to the disc drive, the snubber comprising:

a shroud portion having facing surfaces which circumferentially extend subtantially the length of the snubber beyond the outermost perimeters of the discs and intersecting planes normal to the disc axis along which the first and second discs extend, the shroud portion retaining air currents established by the rotation of the outermost perimeters of the first and second discs;

first, second and third snubber arms extending from the shroud portion toward the disc axis along substantially the length of the snubber, wherein the outer perimeter of the first disc is disposed between the first and second snubber arms and the outer perimeter of the second disc is disposed between the second and third arms, and wherein the snubber is configured to expand to allow placement of the snubber about the outermost perimeters prior to the mounting of the disc stack to the internal deck surface; and a stiffening ring, disposed within the shroud portion, which circumferentially extends substantially the length of the snubber.

7. The disc drive of claim 6, further comprising at least one fastener which secures the snubber to the base deck.

* * * * *